Aug. 2, 1955 W. C. MORRISON 2,714,704

QUANTIZING MODULATION CIRCUIT ARRANGEMENT

Filed March 23, 1951 3 Sheets-Sheet 1

INVENTOR
Wendell C. Morrison
BY
Charles H. Brown
ATTORNEY

INVENTOR
Wendell C. Morrison
BY
Charles H. Brown
ATTORNEY

QUANTIZING MODULATION CIRCUIT ARRANGEMENT

Filed March 23, 1951 3 Sheets-Sheet 3

INVENTOR
Wendell C. Morrison
BY
Charles H. Brown
ATTORNEY 2,714,704
Patented Aug. 2, 1955

2,714,704

QUANTIZING MODULATION CIRCUIT ARRANGEMENT

Wendell Conser Morrison, Princeton, N. J., assignor to Radio Corporation of America, a corporation of Delaware Application March 23, 1951, Serial No. 217,110

14 Claims. (Cl. 332—11)

This invention relates to power amplifiers, and particularly to power amplifiers utilizing quantizing principles.

Quantizing systems are those in which the total amplitude range of input signals is divided into discrete levels, each representing a predetermined incremental increase in input. As each higher level of the input signal is reached, an additional amplifying stage is turned on and, conversely, turned off as the level of the input signal drops below the predetermined level.

The switching system used to turn the amplifiers on and off should operate as well with rapidly changing as with slowly changing signals. This operation has been difficult to achieve, particularly in the case of slowly changing signals since the exact time of reaching the switching level becomes more difficult to determine as the rate of change decreases.

It is an object of this invention to provide a novel method of and means for insuring the accurate on and off switching of power amplifiers.

Still another object of the invention is to provide a novel method of and means for generating quantized signals.

The above and other objects of the invention are obtained in accordance with one embodiment of the invention by dividing the signal into two paths. In one path the signal is the inverse of the signal in the other. If the original signal includes a D.-C. component that varies, then direct current voltages are added to the signals as required, whereby the signals in both paths are made to have the same polarity. As a result, an increase in input signal results in a decrease in the signal level in one path and an increase in the signal level in the other path. A high frequency oscillator is provided in each path and each oscillator is modulated by signals appearing in its path. The modulated outputs of the two oscillators are used to key "on" and "off" respectively flip-flop or switching circuits which control the turning on and off of the amplifiers.

In accordance with another embodiment of the invention, sine wave type signals are applied to the push-pull oscillator to provide the inverse signals in the two paths. To the signals in each path a high frequency voltage is algebraically added. The resultant voltages are used to key "on" and "off" the switching circuits.

The operation of the invention is given in more detail in the following description taken in conjunction with the accompanying drawings in which:

Figs. 1*a* and 1*b* are curves illustrating the quantizing operation;

Figs. 5*a* through 5*e* are a series of curves illustrating the principles of operation of one embodiment of the invention; and Figs. 6*a* through 6*e* graphically illustrate the operation of a different embodiment of the invention.

Figures 1A, 1B:
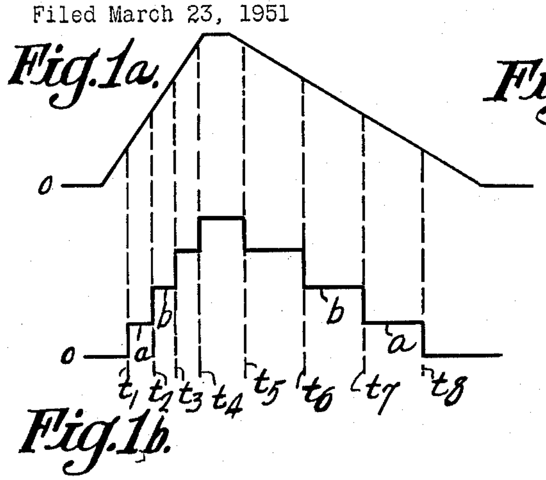

Referring to Fig. 1*a*, there is shown a simple signal having a D.-C. component and which it is desired to quantize. This signal rapidly changes from zero to a maximum while it slowly decreases from maximum to zero. In Fig. 1*b*, there is shown a quantized signal simulating the signal of Fig. 1*a*. The four steps in Fig. 1*b* represent the different levels at which the power amplifiers are turned "on" and "off." Thus at amplitude level "*a*" only one amplifier would be on, at amplitude level "*b*" two amplifiers would be on, and so on. The sequence of keying the amplifiers, assuming only four are employed, would be as follows:

| Time | Amplifiers "on" | Amplifiers "off" |
|---|---|---|
| $t_1$ | 1 | 3 |
| $t_2$ | 2 | 2 |
| $t_3$ | 3 | 1 |
| $t_4$ | 4 | 0 |
| $t_5$ | 3 | 1 |
| $t_6$ | 2 | 2 |
| $t_7$ | 1 | 3 |
| $t_8$ | 0 | 4 |

Although only four amplifying stages have been indicated, it is clear that any desired number could be used in accordance with the number of quantized steps it is desired to provide.

Figure 2:
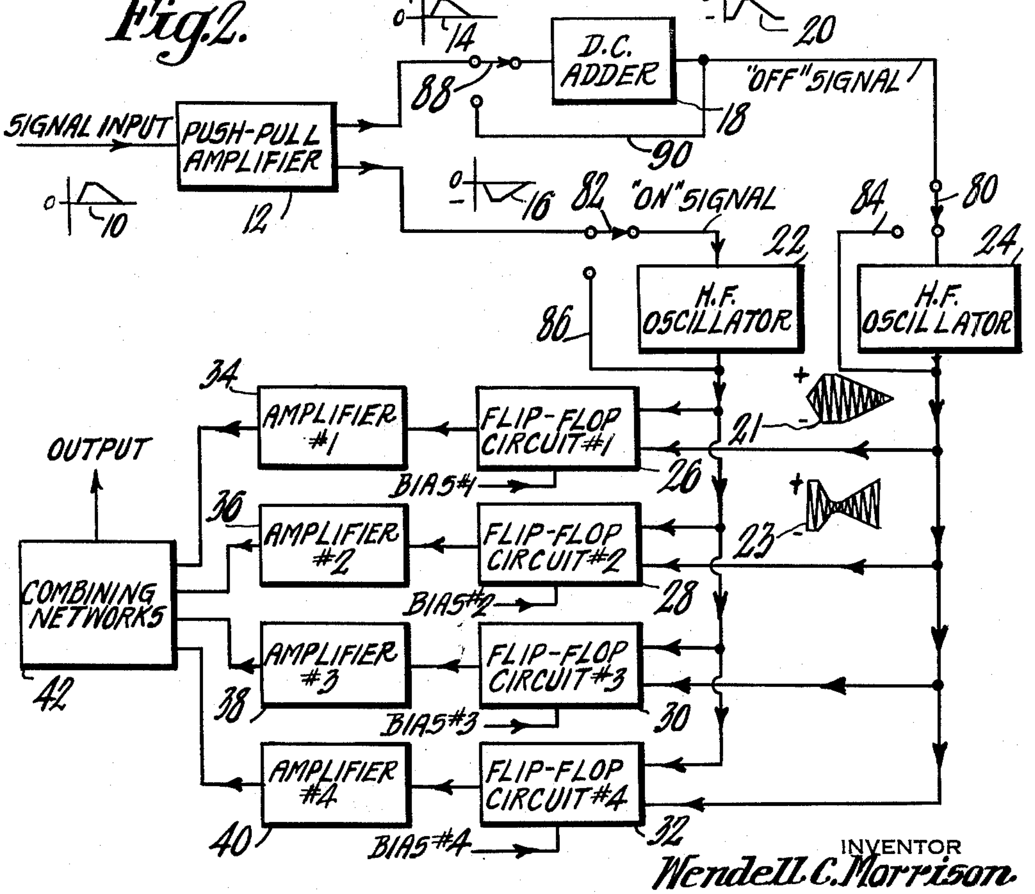
Fig. 2 is a block diagram of a power amplifier incorporating the principles of the invention.

Referring now to Fig. 2, there is illustrated the manner in which the control potentials for operating the switching system are obtained and utilized in accordance with the invention. The amplitude modulated signal, which for simplicity has been indicated as having the wave form 10, is fed to a push-pull amplifier 12. The output of the amplifier 12 provides two signal paths labeled "off" signal and "on" signal, respectively. By maintaining the direct current component of the input signal, the output of the amplifier 12 in the two paths will appear as shown by wave forms 14 and 16. These two signals are similar but 180 degrees out of phase, one, that in the "off" channel, being entirely positive and the other, that in the "on" channel, being entirely negative. By adding a negative voltage to the "off" signal as indicated by the box 18, the "off" signal may be modified to the wave form 20. It will be seen that the "off" signal then is always negative but becomes less negative as the input signal increases in amplitude while the "on" signal is also always negative but becomes more negative with increase in the amplitude of the input signals.

In each path there is provided a high frequency oscillator having a frequency preferably at least twice the highest frequency of the input signal wave. The "on" signal is used to amplitude modulate oscillator 22 while the "off" signal is used to amplitude modulate the oscillator 24. The outputs of these oscillators are indicated by wave forms 21 and 23, respectively.

A number of bistable reciproconductive circuits, 26, 28, 30 and 32, one for each quantizing step, are provided. A reciproconductive circuit as the term is herein construed refers to all two-tube regenerative circuits in which conduction alternates in one or the other tube in response to applied triggering potential. A bistable reciproconductive circuit, sometimes referred to as a "locking circuit" or flip-flop circuit, is one in which two trigger signals are required to switch the circuit from one stable state of conduction to the other and return. These bistable reciproconductive or flip-flop circuits each have one trigger electrode tied to the "on" channel. However, the direct current bias applied to these electrodes would be different for each flip-flop circuit so that each reciproconductive circuit would be triggered "on" at a different voltage level of input signal. The flip-flop circuits are also each provided with another trigger electrode tied to the "off" channel. These other electrodes similarly have different direct current biases applied to them so that the circuits will be triggered "off" at different levels of input signal.

Each flip-flop circuit controls a separate power amplifier, 34, 36, 38 and 40 respectively, controlled in accordance with the "on" or "off" state of its associated trigger circuit. The outputs of the amplifiers are combined in a single circuit 42 to derive a common output signal. An example of such a circuit 42 will be found in co-pending U. S. application Ser. No. 526,635 filed October 4, 1948 of G. H. Brown, now Patent No. 2,602,887, issued July 8, 1952. Since the power in the output signal is dependent upon the number of amplifiers in operation which, as described above, depends upon the amplitude of the input signal, the output signal will be a quantized simulation of the original input signal.

Figure 3:
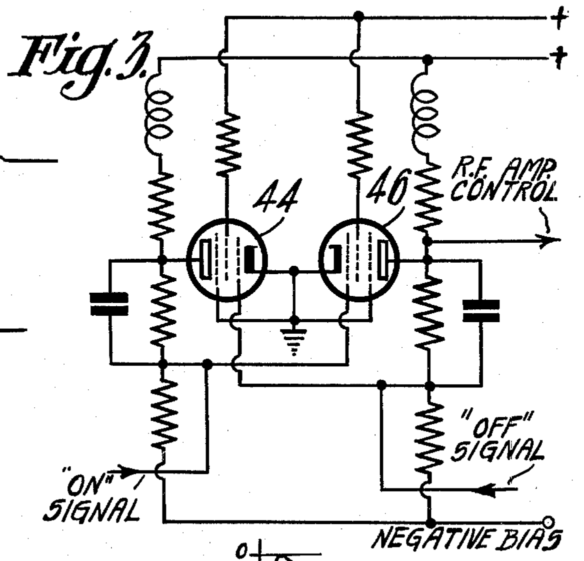
Fig. 3 represents, schematically, a flip-flop circuit which may be used with the invention.

A suitable bistable reciproconductive or flip-flop circuit, similar to the ones used in high speed counters, is shown in Fig. 3. Here, a pair of pentode vacuum tubes 44 and 46 are connected so that one tube is normally conducting while the other tube is normally non-conducting. A negative pulse applied to the grid of one tube reverses this condition. Thus, in the arrangement shown, the tube 46 would be normally conducting and the tube 44 non-conducting. The presence of an "on" signal would produce a negative pulse on the grid of tube 46 cutting it off while at the same time a signal in the "off" channel would reduce the peak grid bias on tube 44 and cause it to conduct. When tube 46 cuts off, its plate potential increases placing the associated amplifier in operating condition.

As already mentioned, the use of the modulated oscillators in the "on" and "off" channels has the effect of presenting sharp keying pulses to the flip-flop circuits and hence insures a more positive action with signals of the slowly changing type. One field of use for the invention where such signals are often found is in the field of television. Here, the signals may change from maximum to minimum, corresponding to from black to white, in less than a microsecond. On the other hand, the signals may be changing very slowly.

Figure 4:
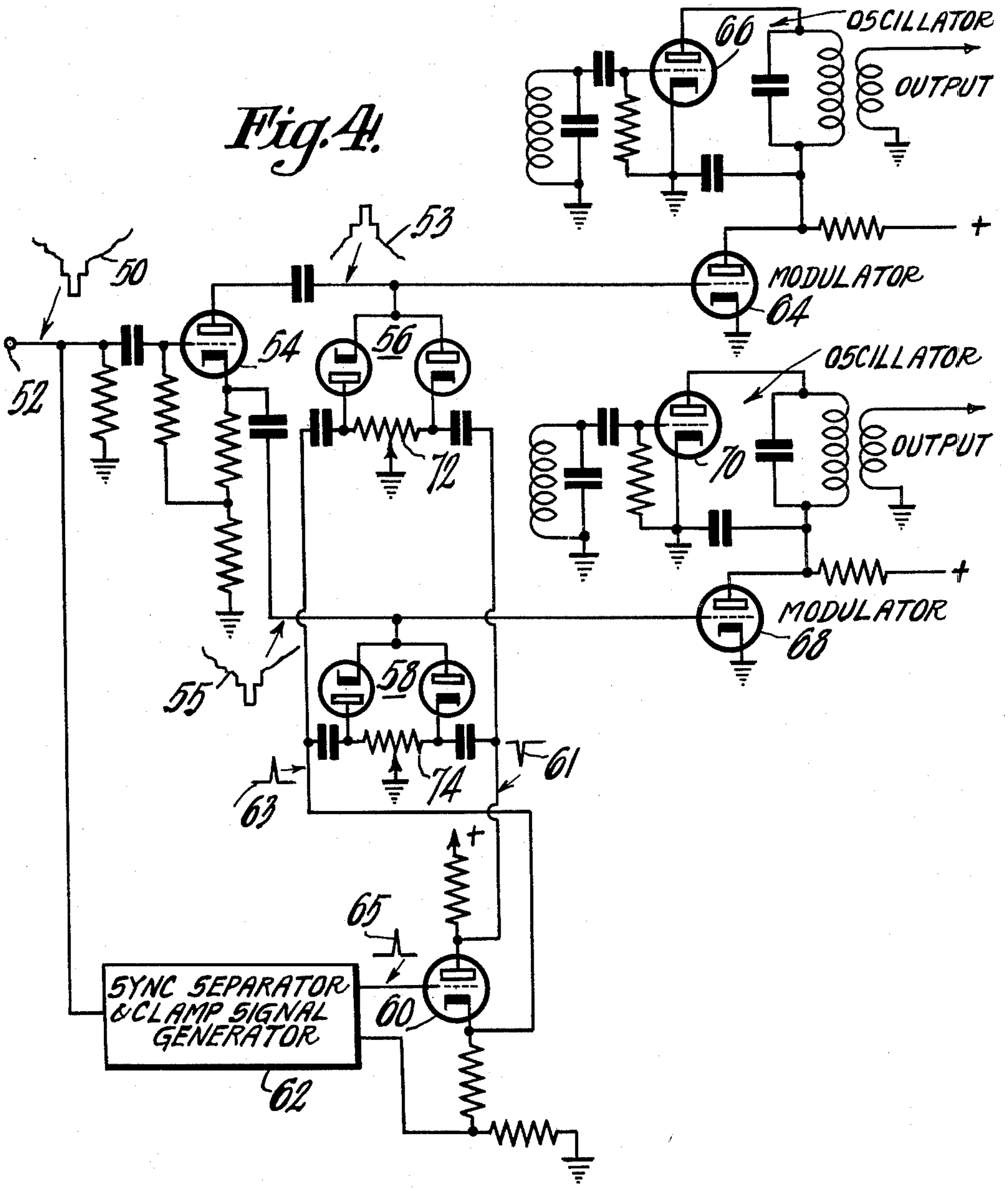
Fig. 4 represents, schematically, one circuit for dividing the input signal into two paths.

Accordingly, for purposes of illustration, there is shown in Fig. 4 one possible arrangement for providing the switching signals and which is designed for use with input television signals. Referring to that figure, the composite video signal, including the synchronizing signal, as shown in wave form 50, is applied to the input terminal 52. The signal is thus applied to a push-pull amplifier arrangement including the amplifier vacuum tube 54. The push-pull signal is taken from the anode and cathode of the tube 54, as indicated by wave forms 53 and 55 respectively. By means of a back-to-back diode clamping circuit 56 the signals in the anode "take-off" circuit are clamped to the required reference voltage at pedestal level and the video signals are in a negative direction from this reference voltage. Similarly, by means of the back-to-back diode clamping circuit 58, the signals in the cathode "take-off" circuit are clamped to a different reference level and video signals extend in a positive direction from this reference voltage. The level at which the clamping circuits 56 and 58 operate is set by the potentiometers 72 and 74. The amplifier 60 is fed with signal pulses 65 derived from a clamp signal generator shown within the box 62 and provides the required push-pull clamp signals, as indicated in wave forms 61 and 63. The generator is in turn synchronously controlled by sync pulses from the video input signal.

The signals in the anode "take-off" path are applied to a modulator vacuum tube 64 which in turn modulates an oscillator 66. Similarly, the signals in the cathode "take-off" path are applied to the modulator vacuum tube 68 which modulates the oscillator 70.

Figures 5A, 5B, 5C, 5D, 5E, 6A, 6B, 6C, 6D, 6E:
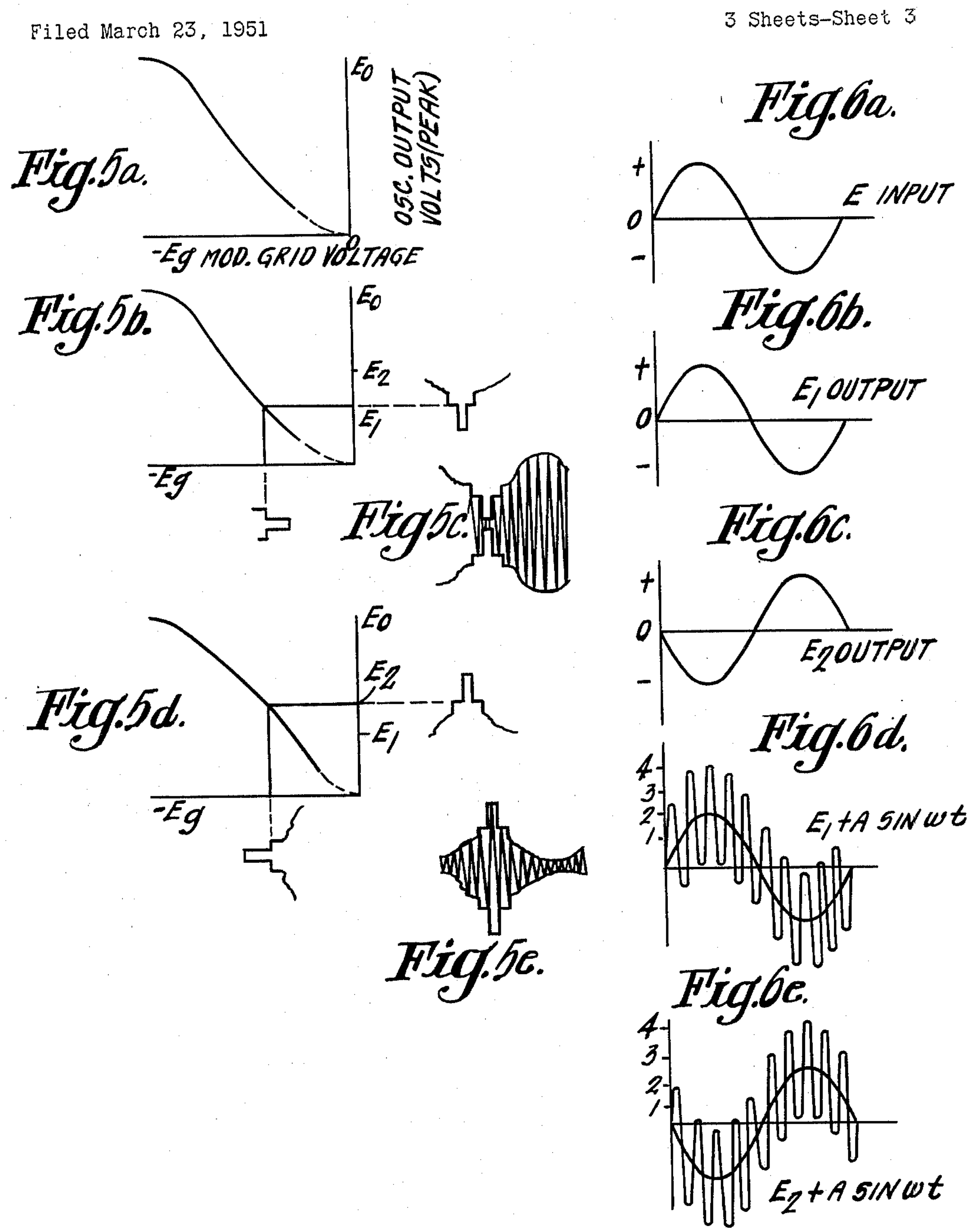

Back-to-back diode clamping circuits are well known in the art. By way of example, reference may be had to U. S. Patent 2,299,945, issued October 27, 1942 to Karl Wendt. Briefly, their operation may be understood by reference to Figs. 5*a* through 5*e*. In Fig. 5*a*, there is shown a curve plotted with the peak oscillator output volts as ordinates and the modulator grid voltages as abscissa.

The bias of modulator tube 64 would be set by clamp circuit 56 as shown in Fig. 5*b*. At blanking level, the output of the oscillator 66 would always be at voltage $E_1$ and picture information would be in a positive direction up to voltage level $E_2$. This would give the "off" signal. The envelope of the oscillator output under these conditions is shown in Fig. 5*c*.

The bias of the modulator tube 68 would be set by clamp circuit 58, as shown in Fig. 5*d*. Here, at blanking level, the output of the oscillator 70 would always be at a voltage $E_2$ while picture information would be in a negative direction down to voltage level $E_1$. This would give the "on" signal. The envelope of the oscillator output under these conditions is shown in Fig. 5*e*.

The operation of this system when using signal intelligence having a sinusoidal type wave form can be understood by reference to Figs. 6*a* through 6*e* in conjunction with Fig. 2. With a signal input of the form shown in Fig. 6*a* to the push-pull amplifier 12, the signal appearing in the "off" channel would be as shown in Fig. 6*b*, while the signal appearing in the "on" channel would be as shown in Fig. 6*c*.

Now, if a high frequency voltage is added to both the "off" and "on" channels, the signals would appear as shown in Figs. 6*d* and 6*e*, respectively. For best results, this high frequency voltage should have a frequency of at least twice the highest signal frequency to be transmitted. It will be noted that in this case the signal does not modulate the high frequency oscillations in the same manner as in the first embodiment but the two are added. This is achieved in Fig. 2 by bypassing the oscillators 24 and 22 by means of the switches 80 and 82 and the bypass leads 84 and 86.

The combined waves, as shown in Figs. 6*d* and 6*c*, constituting the "on" and "off" signals, would be fed to the flip-flop circuits as previously described, keying "on" and "off" the amplifiers at levels 1, 2, 3 and 4.

It should be noted that for operating under these conditions, it is not necessary to provide any addition of a direct current voltage. Accordingly, the direct current voltage adder 18 as shown in Fig. 2 may be bypassed by means of switch 88 and lead 90.

The invention claimed is:

1. A signal amplifier comprising, in combination, means for dividing signals into two paths, the signals in one path being inverse to the signals in the other path, an oscillator in each of said paths under control of the signals in that path, said oscillators being modulated by said inverse signals, a plurality of differently biased switching circuits having separate "on" and "off" electrodes, means coupling the output of one of said oscillators to said "on" electrodes, means coupling the output of the other of said oscillators to said "off" electrodes, amplifiers individual to and controlled by each of said switching circuits, and means for combining the outputs of said amplifiers.

2. A signal amplifier according to claim 1, including means for assuring the same polarity of signals in both of said paths.

3. A signal amplifier according to claim 1, including means to add a direct current voltage to the signals of one path thereby causing said signals to have the same polarity as the signals in the other path, characterized in that the signals in one path decrease in voltage with increasing input signal strength, while the signals in the other path increase in voltage with increasing input signal strength.

4. A signal amplifier comprising, in combination, an electron device having an input electrode, an output electrode and a cathode, means whereby signals may be supplied to said input electrode, means for deriving output signals from said output electrode, means for deriving inverse signals from said cathode, an oscillator modulated by said output signals, an oscillator modulated by said inverse signals, a plurality of differently biased switching circuits coupled to and controlled by said oscillators, and amplifiers under control of the switching circuits, and means for combining the outputs of said amplifiers.

5. A signal amplifier according to claim 4 including voltage control means whereby said output signals and said inverse signals are made to have the same polarity.

6. A signal amplifier according to claim 5 wherein said voltage control means comprises a clamping circuit.

7. In a quantizing system utilizing electronic switching devices provided with "on" and "off" electrodes, the method of operating said devices comprising the steps of amplitude modulating a high frequency wave by a signal wave, applying the resultant wave to said "on" electrode, amplitude modulating another high frequency wave by another signal wave which is the inverse of the first said signal wave, and applying to said "off" electrode the resultant of the high frequency wave amplitude modulated by said inverse signal wave.

8. In a quantizing system utilizing electronic switching devices provided with "on" and "off" electrodes, the method of operating said devices comprising the steps of modulating a high frequency wave by a signal wave, applying the resultant wave to said "off" electrode, providing a second wave which is the inverse of said resultant wave, and applying said inverse wave to said "on" electrode.

9. A signal amplifier comprising in combination means for dividing signals into two paths, the signals in one path being inverse to the signals in the other path, an oscillator for each of said paths, means adding the signals in each path to the oscillations from the oscillator associated with such path, a plurality of differently biased switching circuits having separate "on" and "off" electrodes, means coupling the resultant signals in one of said paths to said "on" electrodes, means coupling the resultant signals in the other of said paths to said "off" electrodes, a plurality of amplifiers, one controlled by each of said switching circuits, and means for combining the output of said amplifiers.

10. In a circuit arrangement for activating a given electric circuit in accordance with the instantaneous variation of an applied slowly changing switching potential wave about a predetermined switching potential level, a source of said switching potential wave, an electronic switch arranged to activate said given electric circuit and having two energizing terminals each arranged to activate said switch on application of potentials of given polarity, means to apply said switching potential wave to one of said terminals, means to invert said switching potential wave, means to apply the inverted switching potential wave to the other of said terminals, and means interposed between said energizing terminals and said source of switching potential wave to convert the latter into an amplitude modulated pulse wave.

11. In a circuit arrangement for activating a given electric circuit in accordance with the variations of a given signal wave, an electronic switch arranged to activate said given electric circuit and having two energizing terminals each arranged to activate said switch on application of potentials of given polarity, means to generate at least one wave of frequency higher than the frequency of said given signal wave, means to modulate said one wave in amplitude proportional to a characteristic of said given signal wave to form one switching potential wave, means to apply said switching potential wave to one of said terminals, means to produce another switching potential wave inverted with respect to said one switching potential wave, and means to apply the inverted switching potential wave to the other of said terminals.

12. In a circuit arrangement for switching a given electric circuit in accordance with the variations of a given signal wave, an electronic switch arranged to switch said given electric circuit and having two energizing circuits arranged to activate said switch in opposite directions on application of potentials of given polarity, means to generate at least one high frequency wave, means to modulate said high frequency wave in accordance with the amplitude of said given signal wave to produce a switching potential wave, means to apply said switching potential wave to one of said circuits, means to invert said switching potential wave, and means to apply the inverted switching potential wave to the other of said circuits.

13. In a switching circuit arrangement of the type wherein a given electric circuit is switched in response to the triggering of a bistable reciproconductive circuit having two energizing terminals each arranged to switch said given electric circuit on application of potentials of given polarity in response to a given signal wave having amplitude limits above and below predetermined switching potential levels, means to improve the response of said bistable reciproconductive circuit to said applied signal wave, said means comprising a phase inverter circuit to which said given signal wave is applied to produce another signal wave of waveform inverted with respect to that of said given signal wave, at least one generator of high frequency coupled to said phase inverter circuit to produce switching potential waves consisting of high frequency waves modulated by said signal waves, and means to apply said switching potential waves to said bistable reciproconductive circuit.

14. A switching circuit arrangement including a bistable reciproconductive circuit having two electron discharge devices each having energizing terminals arranged to alter conduction of both of said devices on application of potentials of given polarity, connections to said reciproconductive circuit whereby a given electric circuit is switched in response to the triggering of said bistable reciproconductive circuit in accordance with the amplitude variations of a given signal wave, said connections comprising a phase inverter circuit to which said given signal wave is applied to produce direct and inverted signal waves, and high frequency oscillators coupled between the outputs of said phase inverter circuit and said energizing terminals to trigger said bistable reciproconductive circuit in accordance with pulses of energy having amplitudes instantaneously proportional to the amplitudes of said direct and inverted signal waves.

References Cited in the file of this patent

UNITED STATES PATENTS

| | | |
|---|---|---|
| 2,086,918 | Luck | July 13, 1937 |
| 2,226,459 | Bingley | Dec. 24, 1940 |
| 2,426,225 | Krause | Aug. 25, 1947 |
| 2,432,204 | Miller | Dec. 9, 1947 |
| 2,534,233 | Cleeton | Dec. 19, 1950 |
| 2,571,017 | Dempsey et al. | Oct. 9, 1951 |